(12) United States Patent
Ham et al.

(10) Patent No.: US 10,216,209 B1
(45) Date of Patent: Feb. 26, 2019

(54) DIGITAL LOW DROP-OUT REGULATOR AND OPERATION METHOD THEREOF

(71) Applicants: SK hynix Inc., Gyeonggi-do (KR); THE TRUSTEES OF COLUMBIA UNIVERSITY IN THE CITY OF NEW YORK, New York, NY (US)

(72) Inventors: Hyun-Ju Ham, Gyeonggi-do (KR); Jong-Hwan Kim, Seoul (KR); Min-Goo Seok, Tenafly, NJ (US); Do-Yun Kim, New York, NY (US); Sung Justin Kim, New York, NY (US)

(73) Assignees: SK Hynix Inc., Gyeonggi-do (KR); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 16/005,129

(22) Filed: Jun. 11, 2018

(51) Int. Cl.
*G05F 1/575* (2006.01)
*G05F 1/59* (2006.01)
(Continued)

(52) U.S. Cl.
CPC .............. *G05F 1/575* (2013.01); *G05F 1/59* (2013.01); *G05F 1/563* (2013.01); *G05F 1/565* (2013.01); *G05F 1/595* (2013.01); *G05F 1/625* (2013.01); *H02M 3/156* (2013.01); *H02M 3/158* (2013.01); *H02M 3/1588* (2013.01); *H02M 2001/0032* (2013.01); *H02M 2001/0045* (2013.01); *Y02B 70/1466* (2013.01)

(58) Field of Classification Search
CPC . G05F 1/56; G05F 1/563; G05F 1/565; G05F 1/575; G05F 1/595; G05F 1/625; H02M 3/156; H02M 3/157; H02M 3/158; H02M 3/1588; H02M 2001/0032; H02M 2001/0045; Y02B 70/1466
See application file for complete search history.

(56) References Cited

U.S. PATENT DOCUMENTS

| 9,870,014 B1* | 1/2018 | Ham | ..................... G05F 1/625 |
| 2014/0070878 A1* | 3/2014 | Kawasaki | ............ G06F 1/3203 327/543 |

(Continued)

FOREIGN PATENT DOCUMENTS

KR 101408201 6/2014

*Primary Examiner* — Jue Zhang
*Assistant Examiner* — Lakaisha Jackson
(74) *Attorney, Agent, or Firm* — IP & T Group LLP

(57) ABSTRACT

A digital Low Drop-Out regulator includes: an event-driven circuit for generating a trigger signal by asynchronously detecting whether an output voltage is out of a threshold range to generate a first error information signal and a first control signal; a time-driven circuit for generating a second error information signal by detecting a change in the output voltage synchronized with a clock signal, and generating a second control signal by combining the first and second error information signals; a clock/trigger control circuit for generating the clock signal having a first or second cycle based on the trigger signal and the first and second error information signals; a first array driver for controlling driving force of the output voltage in response to the first control signal; and a second array driver for controlling the driving force of the output voltage in response to the second control signal.

22 Claims, 12 Drawing Sheets

(51) Int. Cl.
  *G05F 1/563* (2006.01)
  *H02M 1/00* (2006.01)
  *G05F 1/595* (2006.01)
  *H02M 3/156* (2006.01)
  *H02M 3/158* (2006.01)
  *G05F 1/625* (2006.01)
  *G05F 1/565* (2006.01)

(56) References Cited

U.S. PATENT DOCUMENTS

| | | | |
|---|---|---|---|
| 2014/0070879 A1* | 3/2014 | Kawasaki | G06F 1/3203 |
| | | | 327/543 |
| 2014/0266103 A1 | 9/2014 | Wang et al. | |
| 2015/0042300 A1* | 2/2015 | Peker | H02M 3/156 |
| | | | 323/274 |
| 2016/0282889 A1* | 9/2016 | Mahajan | G05F 1/575 |
| 2017/0083033 A1* | 3/2017 | Park | G05F 1/575 |

* cited by examiner

DIGITAL LOW DROP-OUT REGULATOR AND OPERATION METHOD THEREOF

BACKGROUND

1. Field

Various embodiments of the present invention relate to a semiconductor designing technology. Particularly, the embodiments relate to a digital Low Drop-Out (LDO) regulator which is controlled according to a hybrid scheme in which a time-driven scheme and an event-driven scheme are used.

2. Description of the Related Art

Recently, efforts have been made to advance system-on-chip (SOC) technology, i.e., putting various circuits onto a single chip, to keep pace with the trends for diversification and miniaturization of devices. For example, various circuits, such as analog circuits, digital circuits, and radio frequency (RF) circuits, are packaged onto a single chip. As various circuits are integrated into one chip, an efficient and stable power supply voltage management system is required.

A Low Drop-Out (LDO) regulator is one of the elements in a power source voltage management system, and it is used to stably supply a power source voltage to the circuits. To this end, an LDO regulator is used along with a switching regulator. The LDO regulator is used primarily to supply a power source voltage to the circuits that have a small number of external circuits and are sensitive to a supplied voltage without ripple generated internally, such as an Analog-Digital Converter (ADC) and a voltage-controlled oscillator (VCO).

An analog LDO regulator has difficulty in that it cannot lower the power source voltage due to the use of an amplifier, and such regulator has to set a large bandwidth for a high-speed operation. In contrast, a digital LDO regulator does not use any amplifier, and it may be able to greatly reduce the power source voltage while having a bandwidth that is almost infinite, which makes it easy to perform a high-speed operation.

Therefore, researchers and the industry are putting much effort in the research and development of the digital LDO regulator.

SUMMARY

Embodiments of the present invention are directed to a digital Low Drop-Out (LDO) regulator that is controlled according to a hybrid driving method in which a time-driven method performing a synchronous feedback control and an even-driven method performing an asynchronous feed-forward control are mixed together.

In accordance with an embodiment of the present invention, a digital LDO regulator includes: an event-driven circuit suitable for generating a trigger signal by asynchronously detecting whether an output voltage is out of a threshold range or not, and generating a first error information signal and a first control signal based on the trigger signal; a time-driven circuit suitable for generating a second error information signal by detecting a change in the output voltage in synchronization with a clock signal, and generating a second control signal by combining the first error information signal and the second error information signal; a clock/trigger control circuit suitable for generating the clock signal having a first cycle or a second cycle based on the trigger signal, the first error information signal, and the second error information signal; a first array driver suitable for controlling a driving force of the output voltage in response to the first control signal; and a second array driver suitable for controlling the driving force of the output voltage in response to the second control signal.

In accordance with another embodiment of the present invention, a method for operating a digital LDO regulator includes: generating a trigger signal by asynchronously detecting whether an output voltage is out of a threshold range or not, and generating a first error information signal and a first control signal based on the trigger signal; controlling a driving force of the output voltage in response to the first control signal; generating a clock signal of a first cycle based on the trigger signal; generating a second error information signal by detecting a change in the output voltage in synchronization with the clock signal of the first cycle, and generating a second control signal by combining the first error information signal and the second error information signal; and controlling the driving force of the output voltage in response to the second control signal.

In accordance with an embodiment of the present invention, a digital LDO regulator includes: a first circuit suitable for generating a trigger signal, a first error information signal and a first control signal by asynchronously detecting an output voltage outside of a threshold range; a second circuit suitable for detecting a change in the output voltage at each first cycle of a clock signal triggered by the trigger signal, and generating a second control signal according to the first error information signal and a result of the detecting; and a third circuit suitable for adjusting the driving force of the output voltage in response to at least one of the first and second control signals.

DETAILED DESCRIPTION

Figure 1:
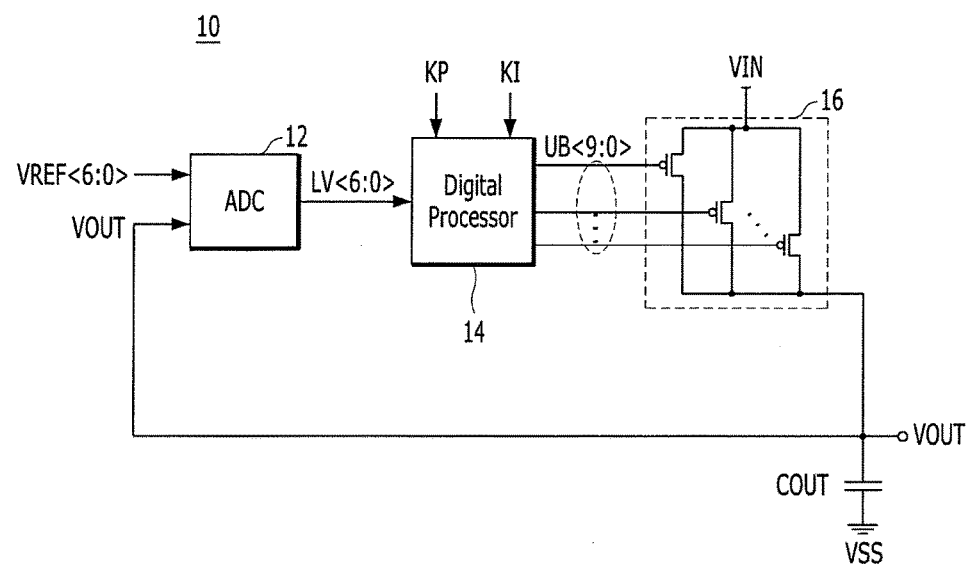
FIG. 1 is a block diagram illustrating a digital Low Drop-Out (LDO) regulator.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and will fully conveys the scope of the present invention to those skilled in the art. Throughout the disclosure, like reference numerals refer to like parts throughout the various figures and embodiments of the present invention. Also, throughout the disclosure, reference to "an embodiment" or the like is not necessarily to only one embodiment, and different references to "an embodiment" or the like are not necessarily to the same embodiment(s).

An analog Low Drop-Out (LDO) regulator realizes loop control through an error amplifier by feeding back an output voltage when a load current suddenly increases and the output voltage drops. The analog LDO regulator may consume excessive standby power and cause stability problems due to an amplifier in the feedback. Also, since a relatively large off-chip output capacitor has to be used for frequency compensation, the size of the circuit may become large, and it is sensitive to external noise.

In addition to the recent research on cap-less LDO regulators that do not have an output capacitor, research is being actively conducted on digital LDO regulators that may operate at high sampling frequencies to reduce the size of output capacitors.

Since control loop latency has to be shortened to eliminate output capacitors or reduce the size of the output capacitors, an analog LDO regulator having a high-speed amplifier or a synchronous, time-driven digital LDO regulator having a high sampling frequency has to be used. However, in case of these regulators, power consumption is becoming a problem. Therefore, an event-driven digital LDO regulator having short control loop latency while maintaining low power consumption is provided herein.

FIG. 1 is a block diagram illustrating a digital Low Drop-Out (LDO) regulator 10 that operates according to an event-driven scheme.

Referring to FIG. 1, the digital LDO regulator 10 may include an analog-digital converter ADC 12, a digital processor 14, and an array driver 16.

The analog-digital converter 12 may receive an output voltage VOUT, which is an analog value, detect an error component, and output an error code LV<6:0>, which is a digital value. The analog-digital converter 12 may compare a plurality of reference voltages VREF<6:0> with the output voltage VOUT and output an error code LV<6:0> based on the comparison result.

The digital processor 14 may be realized as a proportional-integral (PI) controller. That is, the digital processor 14 may include a proportional part for performing fast regulation in an initial state of voltage fluctuation and an integral part for eliminating errors in a steady-state. When the error code LV<6:0> is inputted, the proportional part and the integral part of the digital processor 14 may digitally process the error code LV<6:0> and generate the control signal UB<9:0> by using a proportional gain factor KP and an integral gain factor KI.

The array driver 16 may include a plurality of PMOS transistors that are coupled in parallel between an input voltage VIN and the output voltage VOUT, and the number of transistors that are turned on/off according to a control signal UB<9:0> to adjust the output voltage VOUT. Thereafter, the output voltage VOUT may be provided to an external capacitor COUT.

As described above, the event-driven digital LDO regulator 10 may regard that an event has occurred whenever the error code LV<6:0> changes and generates the control signal UB<9:0>, and adjust the number of transistors that are turned on/off in the array driver 16 according to the generated control signal UB<9:0> so that the output voltage VOUT may be maintained at a set or predetermined voltage level. In FIG. 1, a case where the analog-digital converter 12 performs an operation of comparing the reference voltages VREF<6:0> with the output voltage VOUT in response to a clock (i.e., a clock signal) that toggles at a set or predetermined interval may be called a time-driven digital LDO regulator.

Figure 2:
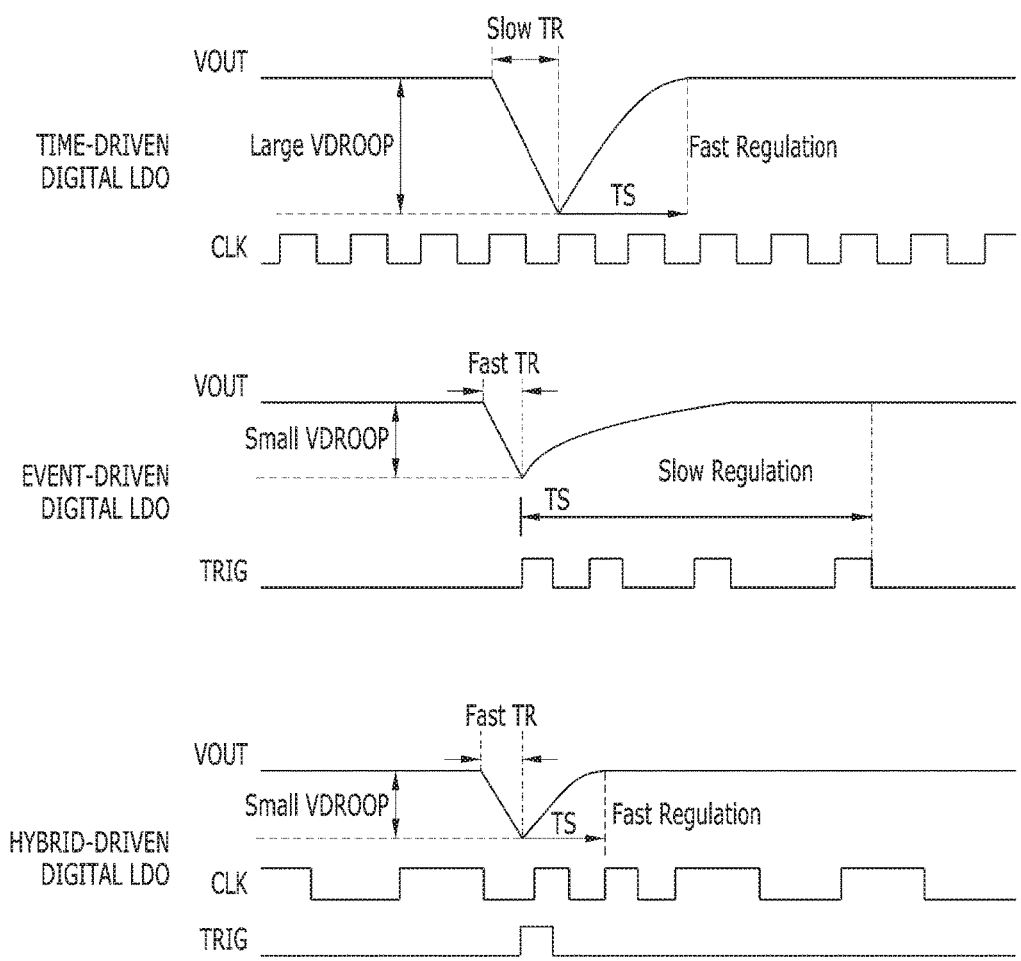
FIG. 2 is a timing diagram illustrating an operation of a digital LDO regulator in accordance with an embodiment of the present invention.

FIG. 2 is a timing diagram illustrating an operation of a digital LDO regulator in accordance with an embodiment of the present invention.

Referring to FIG. 2, the time-driven digital LDO regulator may have a limitation in improving a response time TR due to a sampling frequency of the clock CLK used. The response time TR refers to the time required to detect and sample the first error of the output voltage VOUT of the LDO. As the response time becomes longer, the voltage drop VDROOP of the output voltage VOUT becomes larger, and a larger output capacitor is required. On the other hand, since the time-driven digital LDO regulator operates according to a relatively fast clock CLK, a settling time TS, defined as the time taken to recover the voltage drop VDROOP, is shortened to realize fast regulation performance.

On the other hand, since the event-driven digital LDO operates according to a trigger TRIG which is activated when a change in the output voltage VOUT is detected, the event-driven digital LDO may improve the response time TR. As a result, the voltage drop VDROOP is relatively small. However, since the trigger TRIG is activated only when a significant change in the output voltage (VOUT) is detected, the event-driven digital LDO regulator may exhibit slow regulation performance due to a long settling time TS.

The present invention provides a digital LDO regulator that is controlled according to an event-driven scheme which operates based on a trigger TRIG in the initial stage of a regulation operation, and is controlled according to a time-driven scheme which operates based on a clock CLK after the initial stage of the regulation operation. The digital LDO regulator in accordance with an embodiment of the present invention may improve the regulation performance by improving the response time TR and the fixing time TS by combining the time-driven scheme and the event-driven scheme.

Figure 3:
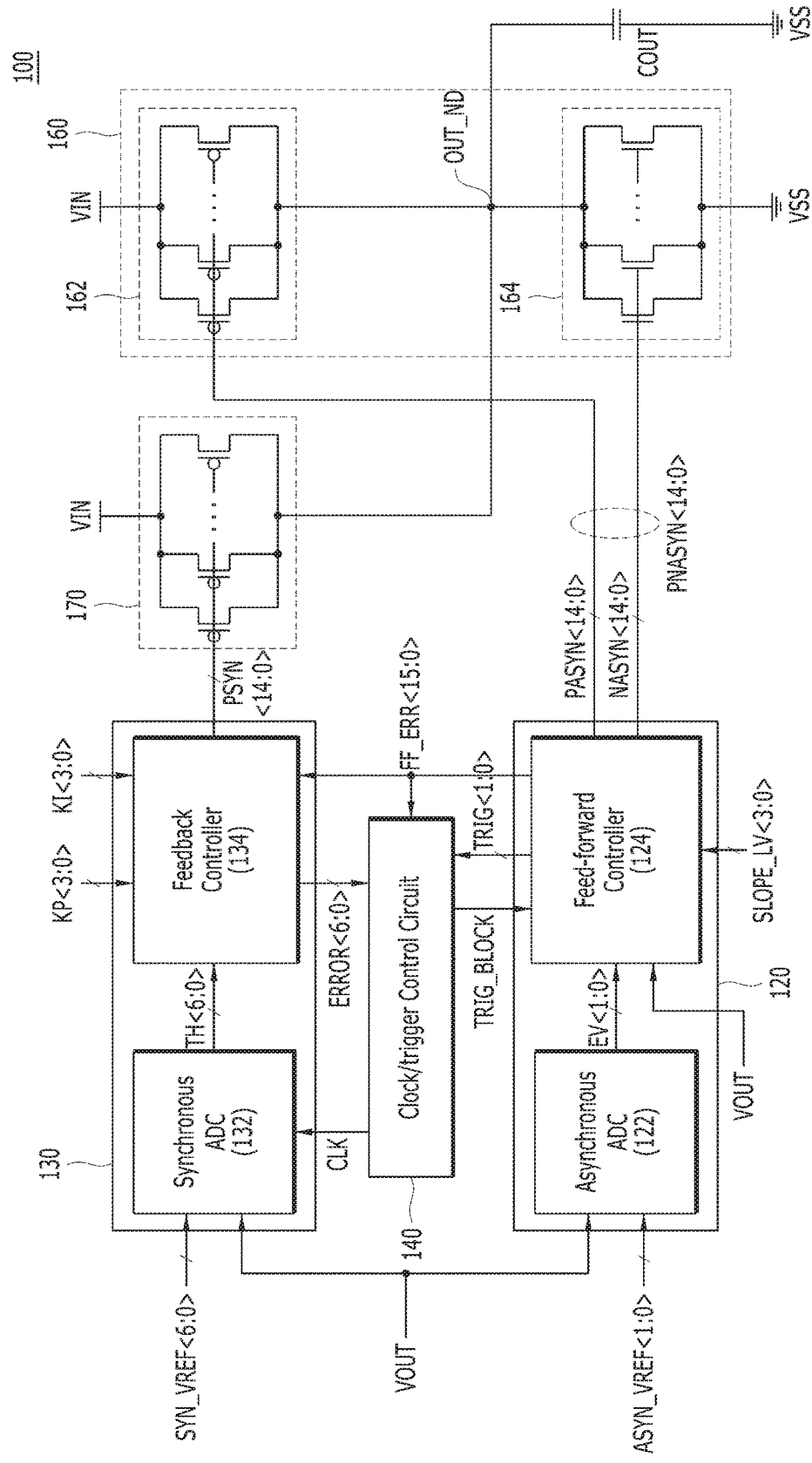
FIG. 3 is a block diagram illustrating a digital LDO regulator in accordance with an embodiment of the present invention.

FIG. 3 is a block diagram illustrating the digital LDO regulator 100 in accordance with an embodiment of the present invention.

Referring to FIG. 3, the digital LDO regulator 100 may include an event-driven circuit 120, a time-driven circuit 130, a clock/trigger control circuit 140, a first array driver 160, and a second array driver 170.

The event-driven circuit 120 may asynchronously detect whether the analog output voltage VOUT outputted from an output node OUT_ND is out of a threshold range THRESHOLD RANGE and generate an asynchronous error code EV<1:0>. The event-driven circuit 120 may not operate in synchronization with a clock that toggles at regular intervals, but operate irregularly by regarding that an event has occurred whenever the asynchronous error code EV<1:0> varies. Therefore, the event-driven circuit 120 may operate asynchronously.

The event-driven circuit 120 may generate a trigger signal TRIG<1:0> that is activated based on the asynchronous error code EV<1:0> and may generate a first error information signal FF_ERR<15:0> and a first drive control signal PNASYN<14:0>. In this case, the first error information signal FF_ERR<15:0> is a signal indicating the extent that the output voltage VOUT is out of the threshold range, and the first drive control signal PNASYN<14:0> is a signal provided for adjusting the driving force of the first array driver 160. The event-driven circuit 120 may block the trigger signal TRIG<1:0> from being generated and activated, in response to the trigger blocking signal TRIG_BLOCK. Accordingly, the event-driven circuit 120 may initialize the first error information signal FF_ERR<15:0> and the first drive control signal PNASYN<14:0> when the trigger signal TRIG<1:0> is deactivated.

To be specific, the event-driven circuit 120 may include an asynchronous analog-digital converter ADC 122 and a feed-forward controller 124.

The asynchronous analog-digital converter ADC 122 may detect whether the output voltage VOUT is out of the threshold range and generate at least two bits of a digital asynchronous error code EV<1:0>. The threshold range may be set based on an upper reference voltage ASYN_VREF<1> and a lower reference voltage ASYN_VREF<0>, and it may be defined as between the upper reference voltage ASYN_VREF<1> and the lower reference voltage ASYN_VREF<0>. When the output voltage VOUT is lower than the lower reference voltage ASYN_VREF<0>, the asynchronous analog-digital converter ADC 122 may activate a first bit EV<0> of the asynchronous error code EV<1:0> to a logic high and output it. When the output voltage VOUT is higher than the upper reference voltage ASYN_VREF<1>, the asynchronous analog-digital converter ADC 122 may activate a second bit EV<1> of the asynchronous error code EV<1:0> to a logic high level and output it.

The feed-forward controller 124 may generate a trigger signal TRIG<1:0> that is activated in response to the asynchronous error code EV<1:0> and is deactivated in response to the trigger blocking signal TRIG_BLOCK. The first bit TRIG<0> and the second bit TRIG<1> of the trigger signal TRIG<1:0> may respectively correspond to the first bit EV<0> and the second bit EV<1> of the asynchronous error code EV<1:0>.

The feed-forward controller 124 may detect the slope of the output voltage VOUT according to the trigger signal TRIG<1:0> and generate the first error information signal FF_ERR<15:0> and the first drive control signal PNASYN<14:0>. For example, the feed-forward controller 124 may compare a plurality of detection reference voltages SL_VREF<3:0> with the output voltage VOUT according to the trigger signal TRIG<1:0> and generate the first error information signal FF_ERR<15:0> and the first drive control signal PNASYN<14:0>.

The time-driven circuit 130 may detect a change in the output voltage VOUT by comparing the output voltage VOUT with a plurality of synchronous reference voltages SYN_VREF<6:0> in synchronization with the dock CLK and may generate a multi-bit synchronization error code TH<0:6>. The time-driven circuit 130 may be defined to operate synchronously in that it operates in synchronization with the clock CLK that toggles at regular intervals.

The time-driven circuit 130 may generate a second error information signal ERR<6:0> according to the synchronization error code TH<0:6>, and generate a second drive control signal PSYN<14:0> by combining the first error information signal FF_ERR<15:0> and the second error information signal ERR<6:0>. The second error information signal ERR<6:0> is information indicating the extent that the output voltage VOUT is out of a target voltage, and the second drive control signal PSYN<14:0> is a signal provided to adjust the driving force of the second array driver 170.

To be specific, the time-driven circuit 130 may include a synchronous analog-digital converter ADC 132 and a feedback controller 134.

The synchronous analog-digital converter ADC 132 may compare the first to seventh synchronous reference voltages SYN_VREF<6:0> with the output voltage VOUT whenever the clock CLK is inputted, detect a change such as overshoot or undershoot of the output voltage VOUT as an error component based on the comparison result, and generate the multi-bit synchronization error code TH<0:6> based on the detected change.

The feedback controller 134 may generate the second error information signal ERR<6:0> according to the synchronization error code TH<0:6>, and may generate the second drive control signal PSYN<14:0> by combining the first error information signal FF_ERR<15: 0> and the second error information signal ERR<6:0>.

The feedback controller 134 may be realized as a proportional-integral (PI) controller. In other words, the feedback controller 134 may generate the second drive control signal PSYN<14:0> by combining the result obtained by reflecting a proportional gain factor KP<3:0> and an integral gain factor KI<3:0> into the second error information signal ERR<6:0> with the first error information signal FF_ERR<15:0> received from the feed-forward controller 124. Although not shown in the drawing, the feedback controller 134 may operate in synchronization with the clock CLK.

The clock/trigger control circuit 140 may generate the clock CLK that toggles at a first cycle or a second cycle which is longer than the first cycle based on the trigger signal TRIG<1:0>, the first error information signal FF_ERR<15:0>, and the second error information signal ERR<6:0>. The first cycle may be referred to as a fast cycle, and the second cycle may be referred to as a slow cycle.

The clock/trigger control circuit 140 may generate a clock CLK of a fast cycle when the trigger signal TRIG<1:0> is activated, and may generate a clock CLK of a slow cycle based on the second error information signal ERR<6:0> when the voltage VOUT is detected to be in a steady state. For example, the clock/trigger control circuit 140 may decide that the output voltage VOUT is in a steady state, when the number of cycles or pulses of the clock CLK counted reaches a set or predetermined number (for example, 3) while the second error information signal ERR<6:0> is kept in the initial value (e.g., '0').

Also, when the output voltage VOUT is determined to be out of the threshold range based on the first error information signal FF_ERR<15:0>, the clock/trigger control circuit 140 may activate the trigger blocking signal TRIG_BLOCK. When the output voltage VOUT is detected to be in a steady state based on the second error information signal ERR<6:0>, the clock/trigger control circuit 140 may deactivate and output the trigger blocking signal TRIG_BLOCK. In other words, the clock/trigger control circuit 140 may control the event-driven circuit 120 not to generate an additional trigger signal TRIG<1:0> in response to the trigger blocking signal TRIG_BLOCK.

The first array driver 160 may adjust the driving force of the output voltage VOUT in response to the first drive control signal PNASYN<14:0>. The first array driver 160 may include a pull-up array 162 for compensating for undershoot of the output voltage VOUT and a pull-down array 164 for compensating for overshoot of the output voltage VOUT. The first drive control signal PNASYN<14:0> may include a pull-up control signal PASYN<14:0> for driving the pull-up array 162 and a pull-down control signal NASYN<14:0> for driving the pull-down array 164.

The pull-up array 162 may include a plurality of pull-up transistors that are coupled in parallel between a power source voltage VIN terminal and an output node OUT_ND and control the number of pull-up transistors that are turned on in response to the pull-up control signal PASYN<14:0>.

The pull-down array 164 may include a plurality of pull-down transistors that are coupled in parallel between the output node OUT_ND and a ground voltage VSS terminal and control the number of pull-down transistors that are turned on in response to the pull-down control signal NASYN<14:0>.

The second array driver 170 may adjust the driving force of the output voltage VOUT of the output node OUT_ND in response to the second drive control signal PSYN<14:0>.

The second array driver 170 may include a plurality of pull-up transistors that are coupled in parallel between a power source voltage VIN terminal and the output node OUT_ND and control the number of pull-up transistors that are turned on in response to the second drive control signal PSYN <14: 0>. In general, the second array driver 170 may be formed to include only pull-up transistors for compensating for undershoot of the output voltage VOUT, since overshoot is more easily controlled than undershoot. However, according to an embodiment, the second array driver 170 may further include a plurality of pull-down transistors that are coupled in parallel between the output node OUT_ND and the ground voltage VSS terminal.

The output voltage VOUT, the driving force of which is adjusted by the first array driver 160 and the second array driver 170, may be provided to the external capacitor COUT through the output node OUT_ND.

The operation of the digital LDO regulator 100 having the above structure may be briefly described as follows.

When the output voltage VOUT maintains a steady state, the clock/trigger control circuit 140 may generate a clock CLK of a slow cycle. Accordingly, the time-driven circuit 130 may detect a change in the output voltage VOUT at a slow cycle. The event-driven circuit 120 may asynchronously detect whether the output voltage VOUT is out of the threshold range.

The event-driven circuit 120 may generate the trigger signal is TRIG<1:0> when the output voltage VOUT goes out of the threshold range, and thus the event-driven circuit 120 may primarily drive the first array driver 160. That is, as soon as the output voltage VOUT fluctuates, the response time may be improved, as the event-driven circuit 120 performs the initial regulation operation.

The clock/trigger control circuit 140 may generate a clock CLK of a fast cycle based on the trigger signal TRIG<1:0>. The time-driven circuit 130 may detect a change of the output voltage VOUT in synchronization with the clock CLK of a fast cycle so as to drive the second array driver 170. The time-driven circuit 130 may drives the second array driver 170 by reflecting the error information (i.e., the first error information signal FF_ERR<15:0>) provided from the event-driven circuit 120. In this way, it is possible to perform a fast regulation operation while maintaining continuity after the initial regulation operation. As a result, the time-driven circuit 130 may improve the settling time by driving the second array driver 170 at a high speed and controlling the output voltage VOUT to reach the target voltage within a short time.

When the time-driven circuit 130 operates based on the clock CLK of a fast cycle, the clock/trigger control circuit 140 may block the event-driven circuit 120 from generating the additional trigger signal TRIG<1:0>. In other words, when the time-driven circuit 130 operates based on the clock CLK of a fast cycle, the event-driven circuit 120 may control the first array driver 160 to be turned off. Therefore, it is possible to minimize the overlap of the operation sections of the time-driven circuit 130 and the event-driven circuit 120, thereby preventing an abrupt overshoot or undershoot of the output voltage VOUT.

Thereafter, when the state of the output voltage VOUT becomes a steady state, the clock/trigger control circuit 140 may generate a clock CLK of a slow cycle based on the trigger signal TRIG<1:0>. Accordingly, the time-driven circuit 130 may detect a change in the output voltage VOUT at a slow cycle. The time-driven circuit 130 may drive the second array driver 170 at a low speed to reduce standby power.

As described above, the digital LDO regulator 100 in accordance with embodiments of the present invention may improve the response time TR and the setting time TS simultaneously by combining the time-driven scheme and the event-driven scheme, thus improving the regulation performance.

The detailed structure of the digital LDO regulator 100 in accordance with embodiments of the present invention is described in detail with reference to the accompanying drawings.

Figure 4:
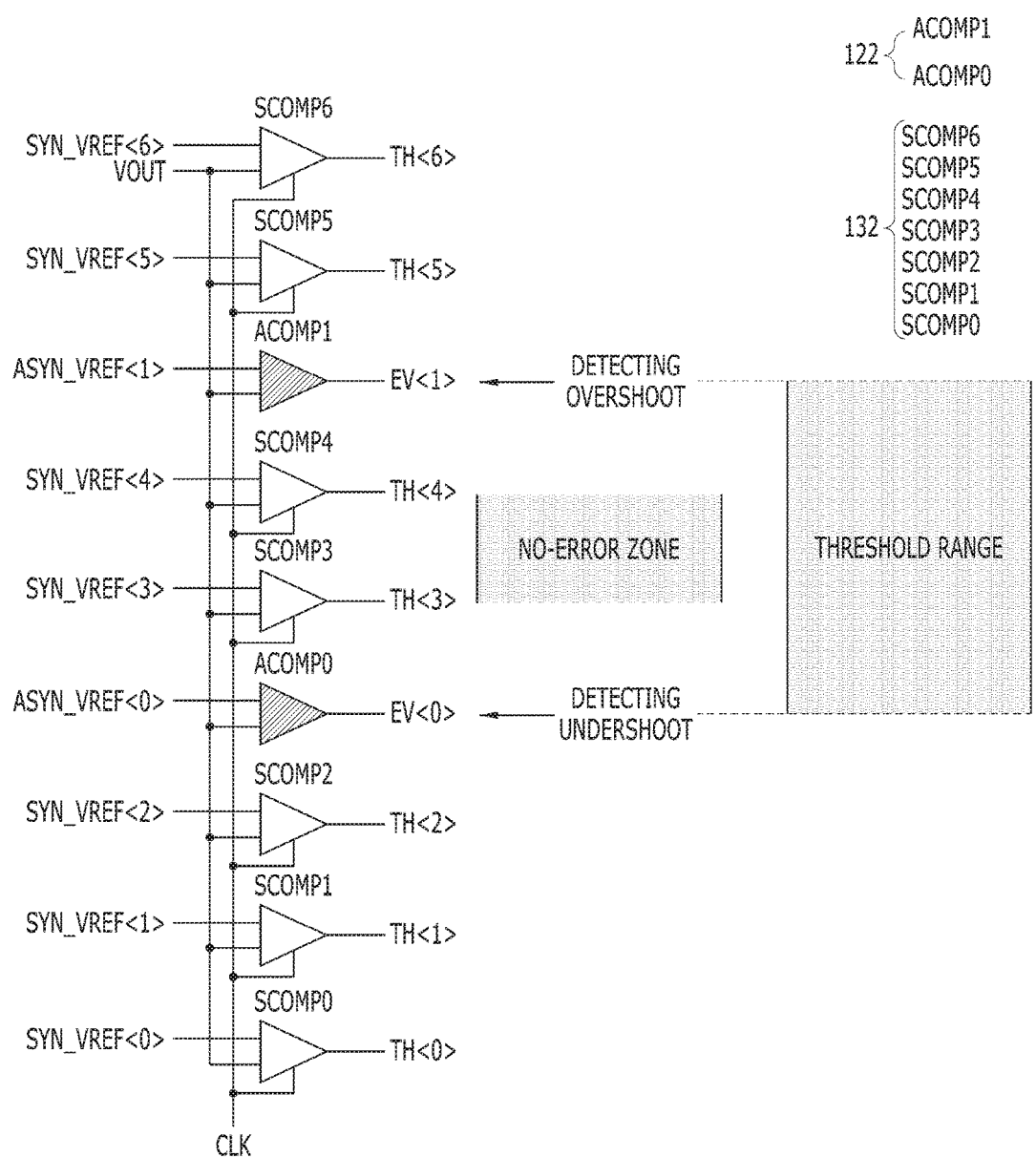
FIG. 4 is a circuit diagram illustrating an exemplary asynchronous analog-digital converter (ADC) and an exemplary synchronous ADC shown in FIG. 3.
Figure 5A:
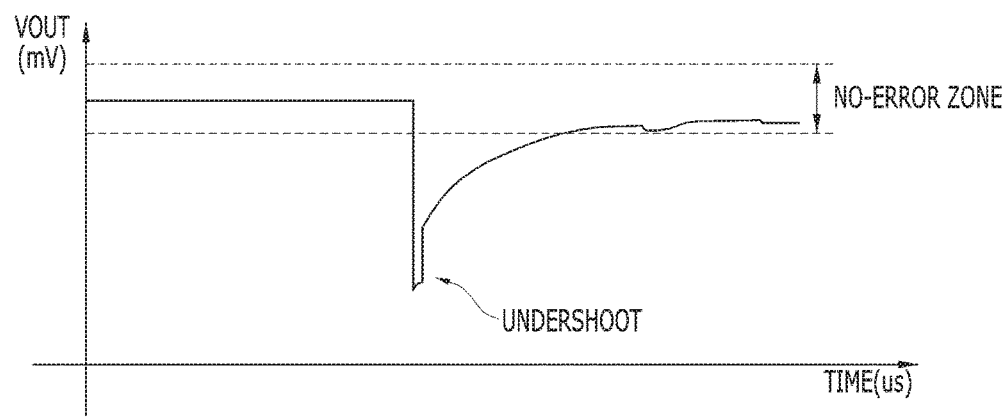
FIGS. 5A and 5B are waveform diagrams describing undershoot and overshoot of an output voltage, respectively, in accordance with an embodiment of the present invention.
Figure 5B:
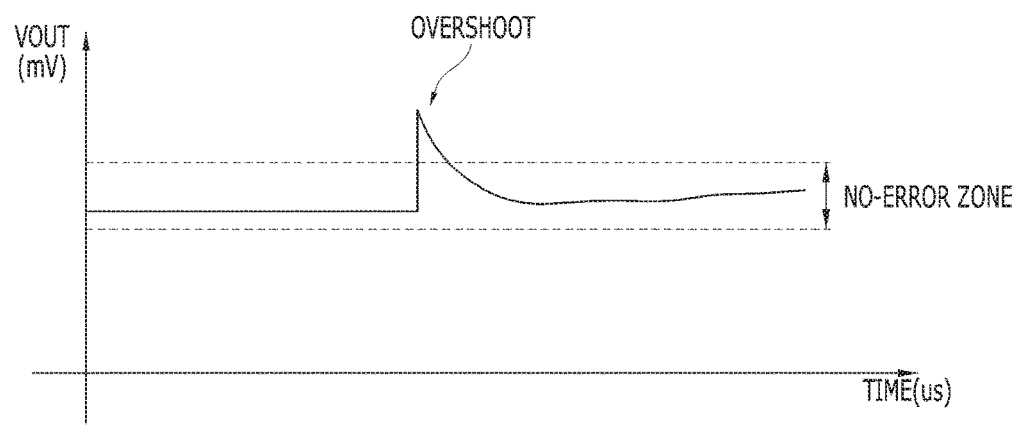

FIG. 4 is a circuit diagram illustrating an asynchronous analog-digital converter ADC and a synchronous analog-digital converter ADC, as shown in FIG. 3. FIGS. 5A and 5B are waveform diagrams describing undershoot and overshoot of an output voltage, respectively.

Referring to FIG. 4, the asynchronous analog-digital converter ADC 122 may include first and second comparators ACOMP0 and ACOMP1 for comparing the output voltage VOUT with the lower reference voltage ASYN_VREF <0> and the upper reference voltage ASYN_VREF <1>. When the output voltage VOUT is lower than the lower reference voltage ASYN_VREF<0>, the first comparator ACOMP0 may activate the first bit EV<0> of the asynchronous error code EV<1: 0> into a logic high level and output it. When the output voltage VOUT is higher than the upper reference voltage ASYN_VREF<1>, the second comparator ACOMP1 may activate the second bit EV<1> of the asynchronous error code EV<1:0> into a logic high level and output it.

The synchronous analog-digital converter ADC 132 may include third to ninth comparators SCOMP0 to SCOMP6 that are activated when the clock CLK is inputted, compare the first to seventh synchronous reference voltages SYN_VREF<6:0> with the output voltage VOUT, individually, and generate the multi-bit synchronization error code TH<0:6>. The synchronization error code TH<0:6> may include a thermometer code, which is a unary code. For example, when the synchronous analog-digital converter ADC 132 outputs a 7-bit synchronization error code TH<0:

6>, the number of '1' in the synchronization error code TH<0:6> may be determined based on the overshoot or undershoot of the output voltage VOUT as shown in the following Table 1.

TABLE 1

| Change in Output Voltage VOUT | Synchronization Error Code TH<6:0> |
|---|---|
| Undershoot | 0000001 |
| Undershoot | 0000011 |
| Undershoot | 0000111 |
| No Error | 0001111 |
| Overshoot | 0011111 |
| Overshoot | 0111111 |
| Overshoot | 1111111 |

It is assumed that the synchronous analog-digital converter ADC 132 outputs an error code LV<6:0> of '0001111' when the output voltage VOUT reaches an ideal target voltage level and there is no substantial change. In other words, the range between the fourth synchronous reference voltage SYN_VREF<3> and the fifth synchronous reference voltage SYN_VREF<4> may be considered a no-error zone in which the output voltage VOUT does not substantially change within the target range.

Referring to FIG. 5A, when the output voltage VOUT undershoots from the no-error zone, as illustrated in FIG. 5A, or the output voltage VOUT overshoots from the no-error zone, as illustrated in FIG. 5B, the synchronous analog-digital converter ADC 132 may detect a change in the output voltage VOUT as an error component whenever the clock CLK is inputted, and may generate the synchronization error code TH<0:6> based on the detected change.

When it is assumed that the first to seventh synchronous reference voltages SYN_VREF<6:0> have sequentially increasing levels, the lower reference voltage ASYN_VREF<0> may be set to a lower level than the fourth synchronous reference voltage SYN_VREF<3>, and the upper reference voltage ASYN_VREF<1> may be set to a higher level than the fifth synchronous reference voltage SYN_VREF<4>.

The threshold range THRESHOLD RANGE may be defined between the upper reference voltage ASYN_VREF<1> and the lower reference voltage ASYN_VREF<0>. Preferably, the lower reference voltage ASYN_VREF<0> may have a level between the level of the third synchronous reference voltage SYN_VREF<2> and the level of the fourth synchronous reference voltage SYN_VRE<3>, and the upper reference voltage ASYN_VREF<1> may have a level between the level of the fifth synchronous reference voltage SYN_VREF<4> and the level of the sixth synchronous reference voltage SYN_VREF<5>. In other words, the asynchronous analog-digital converter ADC 122 may generate the asynchronous error code EV<1:0> by detecting whether the output voltage VOUT goes out of the no-error zone and overshoot or undershoot has occurred or not.

Figure 6:
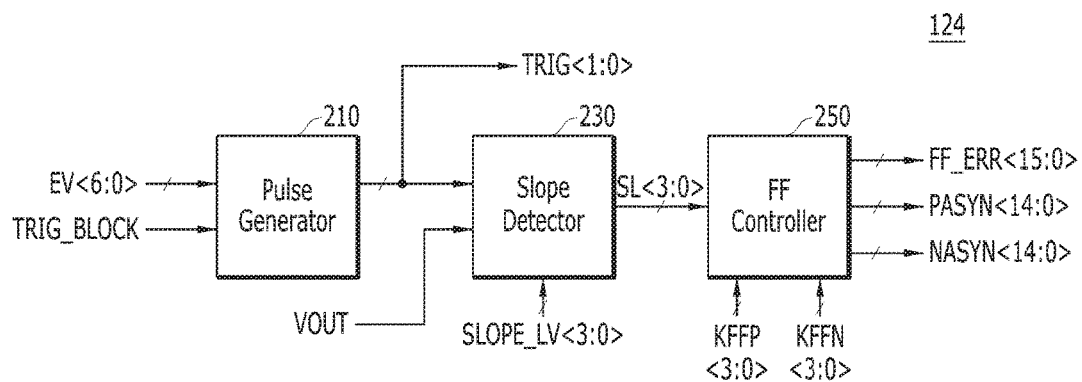
FIG. 6 is a block diagram illustrating an exemplary feed-forward controller shown in FIG. 3.

FIG. 6 is a block diagram illustrating a feed-forward controller 124 shown in FIG. 3.

Referring to FIG. 6, the feed-forward controller 124 may include a pulse generator 210, a slope detector 230, and an FF controller 250.

The pulse generator 210 may generate a trigger signal TRIG<1:0> that is activated in response to the asynchronous error code EV<1:0> and is deactivated in response to the trigger blocking signal TRIG_BLOCK.

The slope detector 230 may output a slope detection signal SL<3:0> by sensing the slope of the output voltage VOUT based on the trigger signal TRIG<1:0>. The slope detector 230 may compare the first to fourth reference voltages SL_VREF<3:0> and the output voltage VOUT based on the trigger signals TRIG<1:0>.

The FF controller 250 may generate the first error information signal FF_ERR<15:0> and the first drive control signal PNASYN<14:0> by reflecting the pull-up gain factor KFFP<3:0> and the pull-down gain factor KFFN<3:0> into the slope detection signal SL<3:0>. The pull-up gain factor KFFP<3:0> may be used to calculate the pull-up control signal PASYN<14:0> of the first drive control signal PNASYN<14:0> and may be used to calculate the pull-down control signal NASYN<14:0> of the first drive control signal PNASYN<14:0>.

Figure 7A:
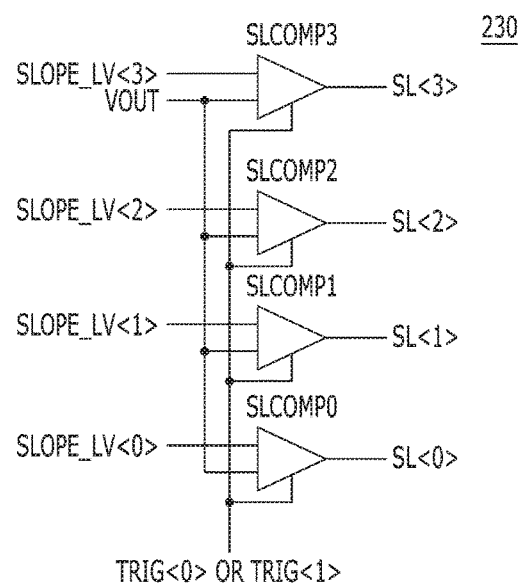
FIG. 7A is a circuit diagram of an exemplary slope detector shown in FIG. 6.
Figure 7B:
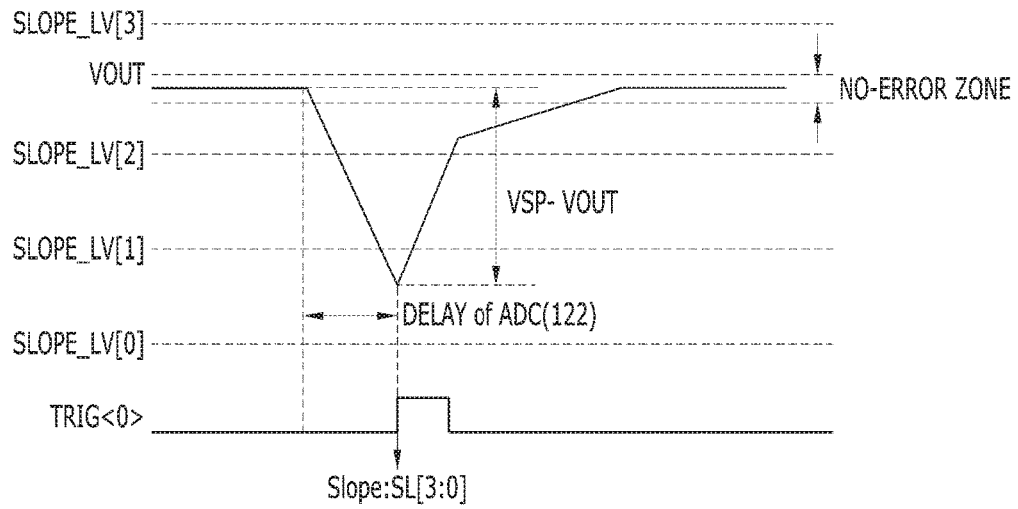
FIG. 7B is a waveform diagram of the slope detector shown in FIG. 6.

FIG. 7A is a circuit diagram of a slope detector, as shown in FIG. 6. FIG. 7B is a waveform diagram of the slope detector shown in FIG. 6.

Referring to FIG. 7A, the slope detector 230 may include first to fourth comparison elements SLCOMP0 to SLCOMP3 that, when any bit of the trigger signal TRIG<1:0> is activated, compare the first to fourth detection reference voltages SL_VREF<3:0> with the output voltages VOUT, and output a change in the output voltages VOUT as a four-bit slope detection signal SL<3:0>. The first to third detection reference voltages SL_VREF<2:0> may be the voltages used for detecting the undershoot of the output voltage VOUT. The first to third detection reference voltages SL_VREF<2:0> may have substantially the same level as the levels of the first to third synchronous reference voltages SYN_VREF<2:0>. Also, the fourth detection reference voltage SL_VREF<3> may be a voltage that is used for detecting an overshoot of the output voltage VOUT and may have a level substantially the same as the level of the fourth synchronous reference voltage SYN_VREF<3>. In other words, the first to third bits SL<2:0> of the slope detection signal SL<3:0> may be bits corresponding to the undershoot of the output voltage VOUT, and the fourth bit SL<3> may be a bit corresponding to an overshoot of the output voltage VOUT. Just as the synchronization error code TH<0:6>, the slope detection signal SL<3:0> may be formed of a thermometer code (i.e., a unary code). In other words, the number of '1' of the slope detection signal SL<3:0> may be determined based on the overshoot or undershoot of the output voltage VOUT.

Referring to FIG. 7B, the first to fourth comparison elements SLCOMP0 to SLCOMP3 may output the slope detection signal SL<3:0> which varies from '0111' to '0001' based on the change in the output voltage VOUT. The slope detection signal SL<3:0> of '0111' may be a value corresponding to the no-error zone, that is, the output voltage VOUT of the steady state, which will be referred to as a steady state value VSP, hereafter, and the slope detection signal SL<3:0> of '0001' may be a value corresponding to the output voltage VOUT when the trigger signal TRIG<1:0> is activated. In short, the slope detection signal SL<3:0> varying from '0111' to '0001' may correspond to the voltage drop amount of the output voltage VOUT.

The time variation amount may be defined as the amount of time until the trigger signal TRIG<1:0> is generated as the output voltage VOUT undershoots from the steady state. Since the delay time of the asynchronous analog-digital converter ADC 122 is much greater than the delay time of the pulse generator 210, the time variation amount may correspond to the delay time of the asynchronous analog-digital converter ADC 122. Since the delay amount between the steady state voltage VSP and the asynchronous analog-digital converter ADC 122 is a set or predetermined value, the slope detector 230 may output the slope detection signal SL<3:0>, which corresponds to the voltage drop amount compared with the time variation amount, as information on the slope of the output voltage VOUT.

Figure 8:
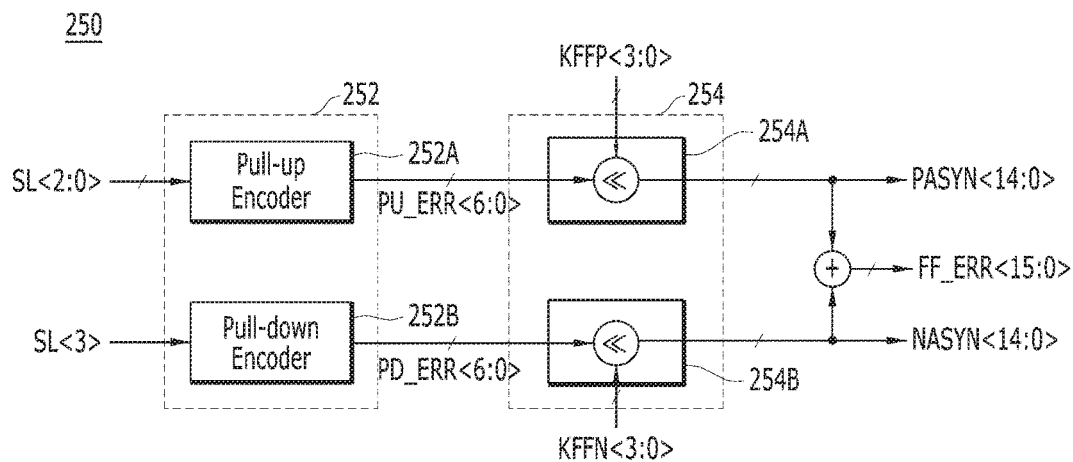
FIG. 8 is a block diagram describing an exemplary feed-forward (FF) controller shown in FIG. 6.

FIG. 8 is a block diagram describing a feed-forward (FF) controller, as shown in FIG. 6.

Referring to FIG. 8, the FF controller 250 may include a first error encoding element 252, a first shifting element 254, and a first summation element 256.

The first error encoding element 252 may generate a pull-up error information signal PU_ERR<6:0> and a pull-down error information signal PD_ERR<6:0> by encoding the slope detection signal SL<3:0>. The first error encoding element 252 may convert the slope detection signal SL<3:0>, which is a thermometer code, into the pull-up error information signal PU_ERR<6:0> and the pull-down error information signal PD_ERR<6:0>.

To be specific, the first error encoding element 252 may include a pull-up encoder 252A and a pull-down encoder 252B.

The pull-up encoder 252A may generate the pull-up error information signal PU_ERR<6:0> by encoding first to third bits SL<2:0> of the slope detection signal SL<3:0> corresponding to the undershoot of the output voltage VOUT. The pull-down encoder 252B may generate the pull-down error information signal PD_ERR<6:0> by encoding a fourth bit SL<3> of the slope detection signal SL<3:0> corresponding to the overshoot of the output voltage VOUT.

The first shifting element 254 may generate the first drive control signal PNASYN<14:0> including the pull-up control signal PASYN<14:0> and the pull-down control signal NASYN<14:0> by shifting the pull-up error information signal PU_ERR<6:0> and the pull-down error information signal PD_ERR<6:0> based on the pull-up gain factor KFFP<3:0> and the pull-down gain factor KFFN<3:0>.

To be specific, the first shifting element 254 may include a pull-up shifter 254A and a pull-down shifter 254B.

The pull-up shifter 254A may generate the pull-up control signal PASYN<14:0> by shifting the pull-up error information signal PU_ERR<6:0> based on the pull-up gain factor KFFP<3:0>. The pull-down shifter 254B may generate the pull-down control signal NASYN<14:0> by shifting the pull-down error information signal PD_ERR<6:0> based on the pull-down gain factor KFFN<3:0>.

The first summation element 256 may sum up the pull-up control signal PASYN<14:0> and the pull-down control signal NASYN<14:0> to output the first error information signal FF_ERR<15:0>.

Figure 9:
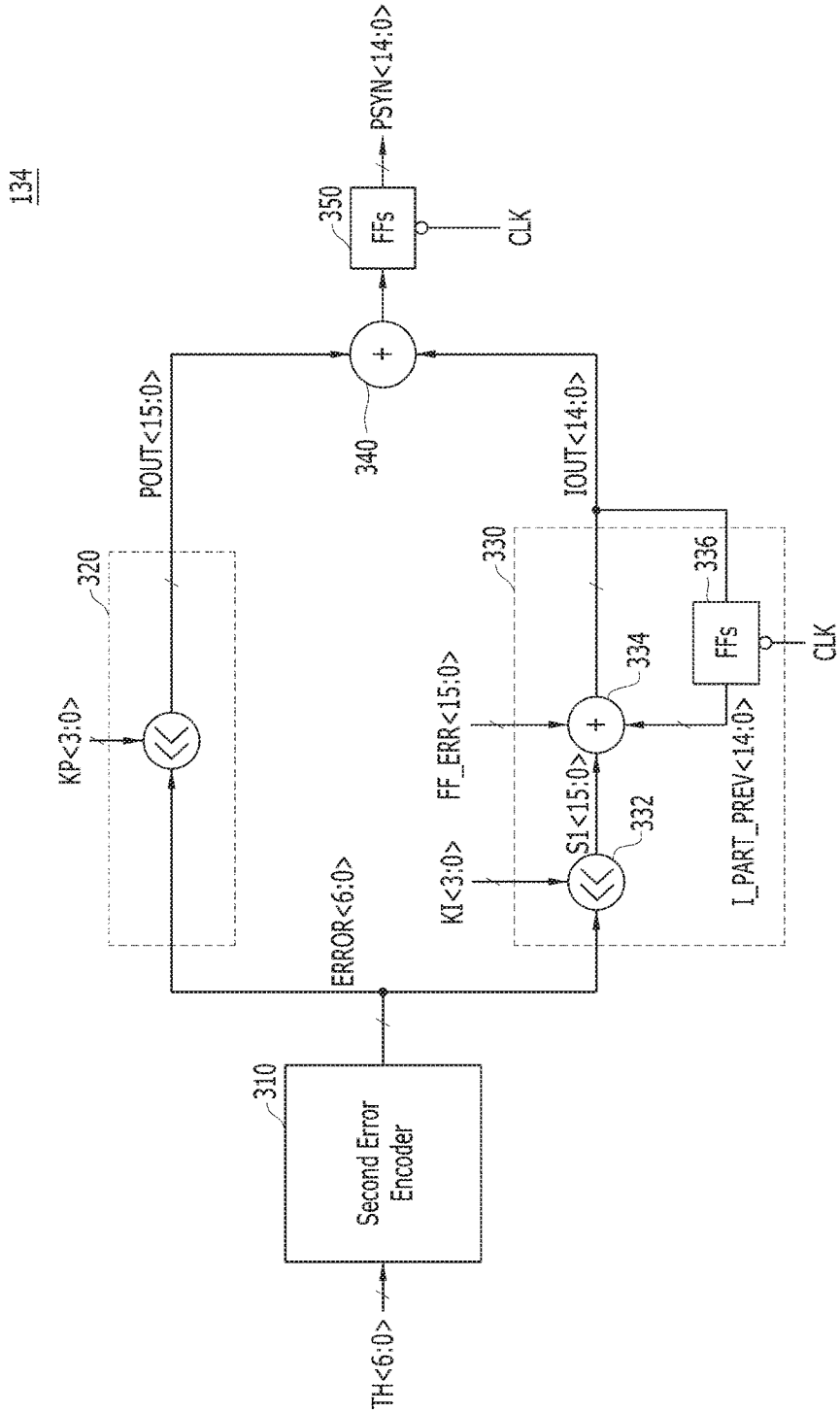
FIG. 9 is a block diagram describing an exemplary feedback controller shown in FIG. 3.

FIG. 9 is a block diagram describing the feedback controller 134 shown in FIG. 3.

Referring to FIG. 9, the feedback controller 134 may include a second error encoder 310, a proportional controller 320, an integral controller 330, and a second summation element 340.

The second error encoder 310 may generate the second error information signal ERR<6:0> by encoding the synchronization error code TH<0:6>. The second error encoder 310 may convert the synchronization error code TH<0:6>, which is a thermometer code, into the second error information signal ERR<6:0>, which is a binary code.

The proportional controller 320 may generate a proportional control signal POUT<15:0> by shifting the second error information signal ERR<6:0> based on the proportional gain factor KP<3:0>. The proportional controller 320 may include a proportional shifter.

The integral controller 330 may generate an integral control signal IOUT<14:0> by shifting the second error information signal ERR<6:0> based on the integral gain factor KI<3:0> so as to produce a shift result S1<15:0> and summing the shift result S1<15:0> with a previous integral control signal I_PART_PREV<14:0> and the first error information signal FF_ERR<15:0>.

To be specific, the integral controller 330 may include an integral shifter 332, a first latch 336, and a third summation element 334.

The integral shifter 332 may output the shift result S1<15:0> by shifting the second error information signal ERR<6:0> based on the integral gain factor KI<3:0>.

The first latch 336 may be fed back with the integral control signal IOUT<14:0> based on the clock CLK and output the previous integral control signal I_PART_PREV<14:0>.

In an embodiment of the present invention, the first latch 336 may latch the integral control signal IOUT<14:0> in synchronization with a falling edge of the clock CLK to output the previous integral control signal I_PART_PREV<14:0>.

The third summation element 334 may sum up the shift result S1<15:0>, the previous integral control signal I_PART_PREV<14:0> and the first error information signal FF_ERR<15:0> and generate the integral control signal IOUT<14:0>.

The second summation element 340 may generate the second drive control signal PSYN<14:0> by summing up the proportional control signals POUT<15:0> and the integral control signal IOUT<14:0>.

The feedback controller 134 may further include a second latch 350 that latches the output of the second summation element 340 based on the clock CLK. According to an embodiment of the present invention, the second latch 350 may latch the second drive control signal PSYN<14:0> in synchronization with a falling edge of the clock CLK and output the second drive control signal PSYN<14:0>.

As described above, the feedback controller 134 according to an embodiment of the present invention may generate the second drive control signal PSYN<14:0> by reflecting the shift result S1<15:0> which is produced by shifting the second error information signal ERR<6:0>, the previous integral control signal I_PART_PREV<14:0>, and the error information provided by the event-driven circuit 120 (i.e., the first error information signal FF_ERR<15:0>). As a result, the time-driven circuit 130 may perform a fast regulation operation while maintaining the continuity of the regulation operation by reflecting the error information after the initial regulation operation is performed by the event-driven circuit 120.

Figure 10:
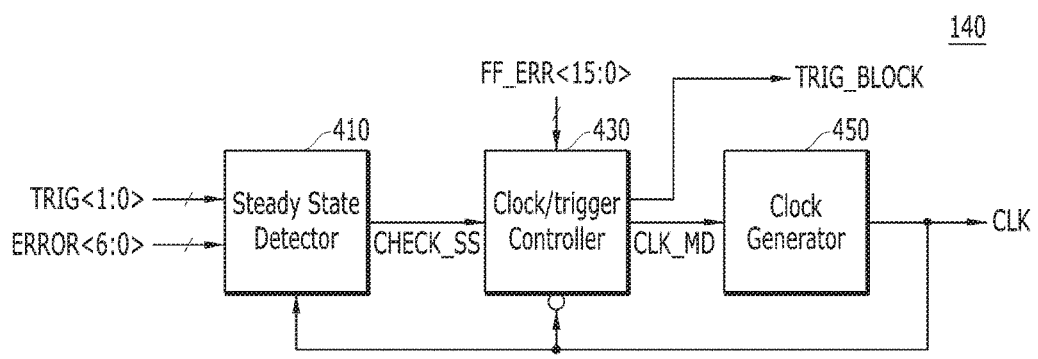
FIG. 10 is a block diagram describing an exemplary clock/trigger control circuit shown in FIG. 3.

FIG. 10 is a block diagram describing the clock trigger control circuit 140 shown in FIG. 3.

Referring to FIG. 10, the clock/trigger control circuit 140 may include a steady state detector 410, a clock/trigger controller 430, and a clock generator 450.

The steady state detector 410 may generate a steady state detection signal CHECK_SS which is deactivated based on the trigger signals TRIG<1:0> and activated based on the second error information signals ERR<6:0>. The steady state detection signal CHECK_SS may be a signal that is activated to a logic high level when the output voltage VOUT is in a steady state. The steady state detector 410 may activate the steady state detection signal CHECK_SS by deciding that the output voltage VOUT is in a steady state when the number of clock CLK cycles counted reaches a set of predetermined number (for example, 3) while the second error information signal ERR<6:0> is maintained at the initial value, e.g., 3.

The clock/trigger controller 430 may generate a clock mode signal CLK_MD and a trigger blocking signal TRIG_BLOCK based on the steady state detection signal CHECK_SS and the first error information signal FF_ERR<15:0>.

The clock generator 450 may generate a clock CLK having a fast cycle or a slow cycle based on the clock mode signal CLK_MD. For example, when the clock mode signal CLK_MD is in a logic high level, the clock generator 450 may generate a clock CLK of a fast cycle. When the clock mode signal CLK_MD is in a logic low level, the clock generator 450 may generate a clock CLK of a slow cycle.

Figure 11:
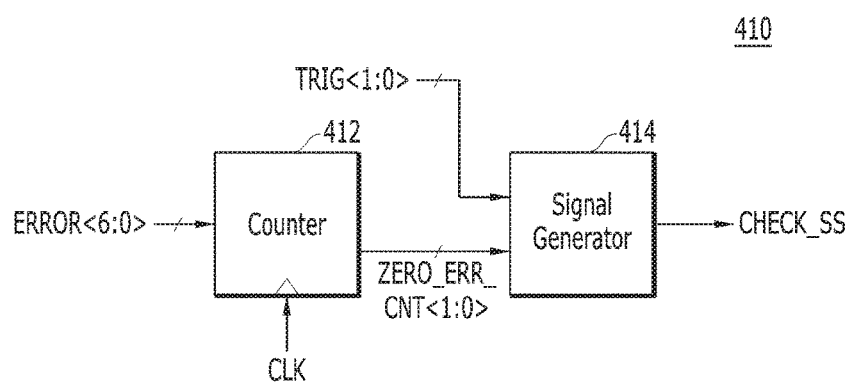
FIG. 11 is a block diagram describing an exemplary steady state detector shown in FIG. 10.

FIG. 11 is a block diagram describing the steady state detector 410 shown in FIG. 10.

Referring to FIG. 11, the steady state detector 410 may include a counter 412 and a signal generator 414.

The counter 412 may be enabled when the second error information signal ERR<6:0> comes to have the initial value, and generate a no-error counting signal ZERO_ERR_CNT<1:0> by counting cycles of the clock CLK. In other words, the counter 412 may generate the no-error counting signal ZERO_ERR_CNT<1:0> by counting cycles of the clock CLK while the second error information signal ERR<6:0> is maintained at the initial value.

The signal generator 414 may be deactivated based on the trigger signal TRIG<1:0> and generate the steady state detection signal CHECK_SS which is activated when the no-error counting signal ZERO_ERR_CNT<1:0> reaches a set or predetermined value, for example, '3', which is a full counting value.

Figure 12:
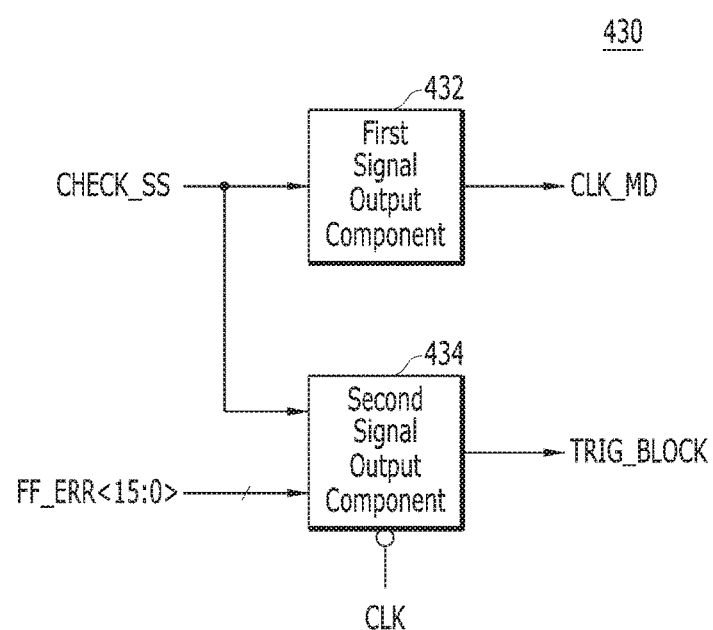
FIG. 12 is a block diagram describing an exemplary clock/trigger controller shown in FIG. 10.

FIG. 12 is a block diagram describing the clock/trigger controller 430 shown in FIG. 10.

Referring to FIG. 12, the clock/trigger controller 430 may include a first signal output component 432 for outputting the clock mode signal CLK_MD and a second signal output component 434 for outputting the trigger blocking signal TRIG_BLOCK.

The first signal output component 432 may output the clock mode signal CLK_MD according to the steady state detection signal CHECK_SS. According to an embodiment of the present invention, the first signal output component 432 may invert and buffer the steady state detection signal CHECK_SS and output the inverted and buffered signal as the clock mode signal CLK_MD.

The second signal output component 434 may output the trigger blocking signal TRIG_BLOCK, which is activated when the first error information signal FF_ERR<15: 0> has a set or predetermined value and deactivated in response to the activation of the steady state detection signal CHECK_SS.

When the event-driven circuit 120 generates the first error information signal FF_ERR<15:0> according to the trigger signal TRIG<1:0>, the first error information signal FF_ERR<15:0> may have a set or predetermined value. According to an embodiment of the present invention, the second signal output component 434 may activate the trigger blocking signal TRIG_BLOCK in synchronization with a falling edge of the clock CLK when the first error information signal FF_ERR<15:0> has a set or predetermined value.

As described above, the clock/trigger control circuit 140 according to an embodiment of the present invention may generate the steady state detection signal CHECK_SS, which is deactivated according to the trigger signal TRIG<1: 0> and activated according to the second error information signal ERR<6:0>, and thereby generate the clock CLK having a fast cycle or a slow cycle. The steady state detector 410 may determine that the output voltage VOUT has become a steady state when the number of clock CLK cycles counted reaches a set or predetermined number, e.g., 3, while the second error information signal ERR<6:0> is maintained at the initial value (for example, '0'), and activate the steady state detection signal CHECK_SS. In other words, since the clock CLK is switched between a fast cycle and a slow cycle based on two conditions of a voltage threshold value as well as a stable state, the stability may be improved, and the setting time may become shorter than when a single type of a condition, e.g., the voltage threshold value, is used.

The operation of the digital LDO regulator according to an embodiment of the present invention will be described with reference to FIGS. 3 to 14.

Figure 13:
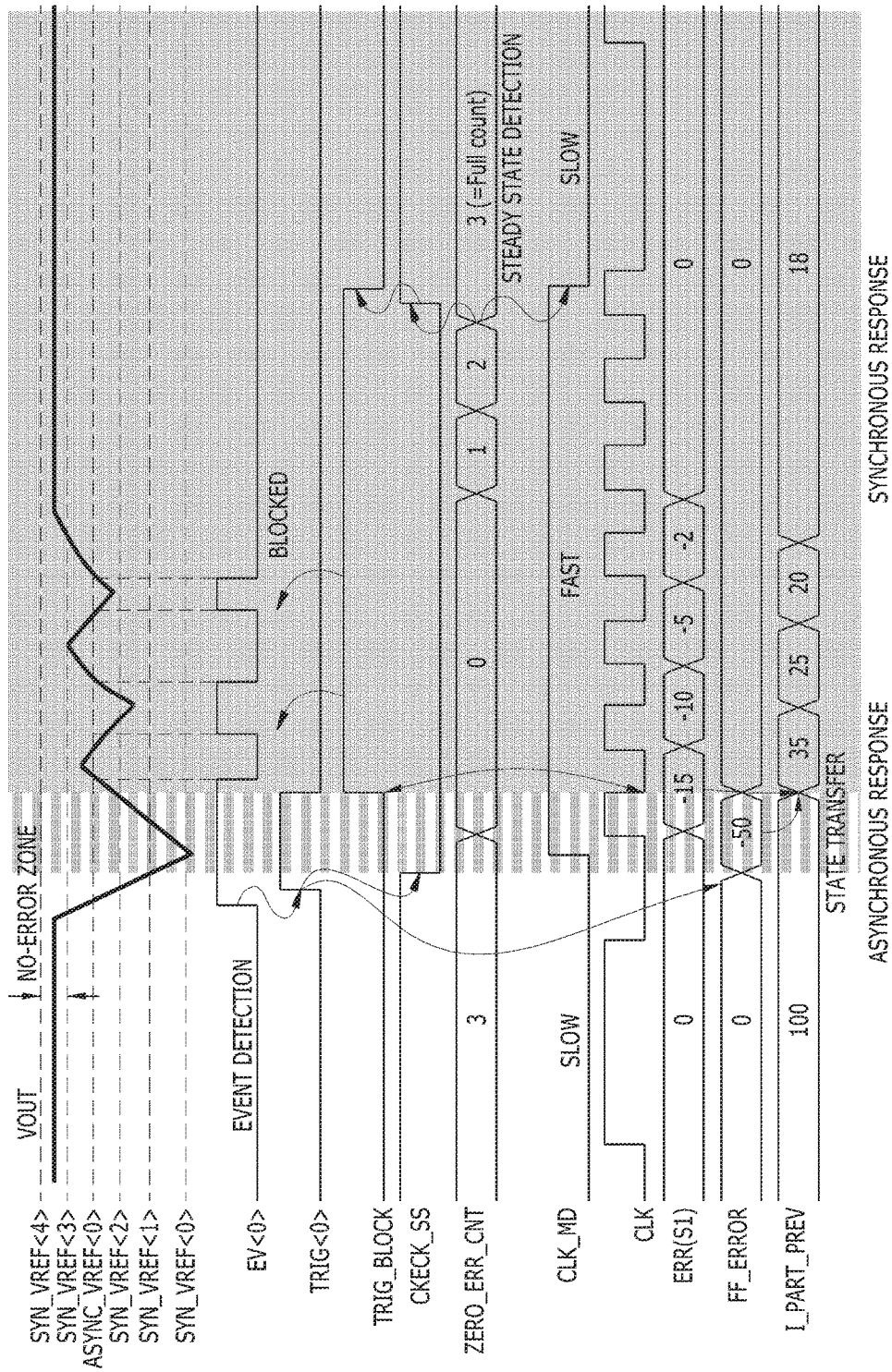
FIG. 13 is a timing diagram illustrating an exemplary operation of the digital LDO regulator shown in FIG. 3.
Figure 14:
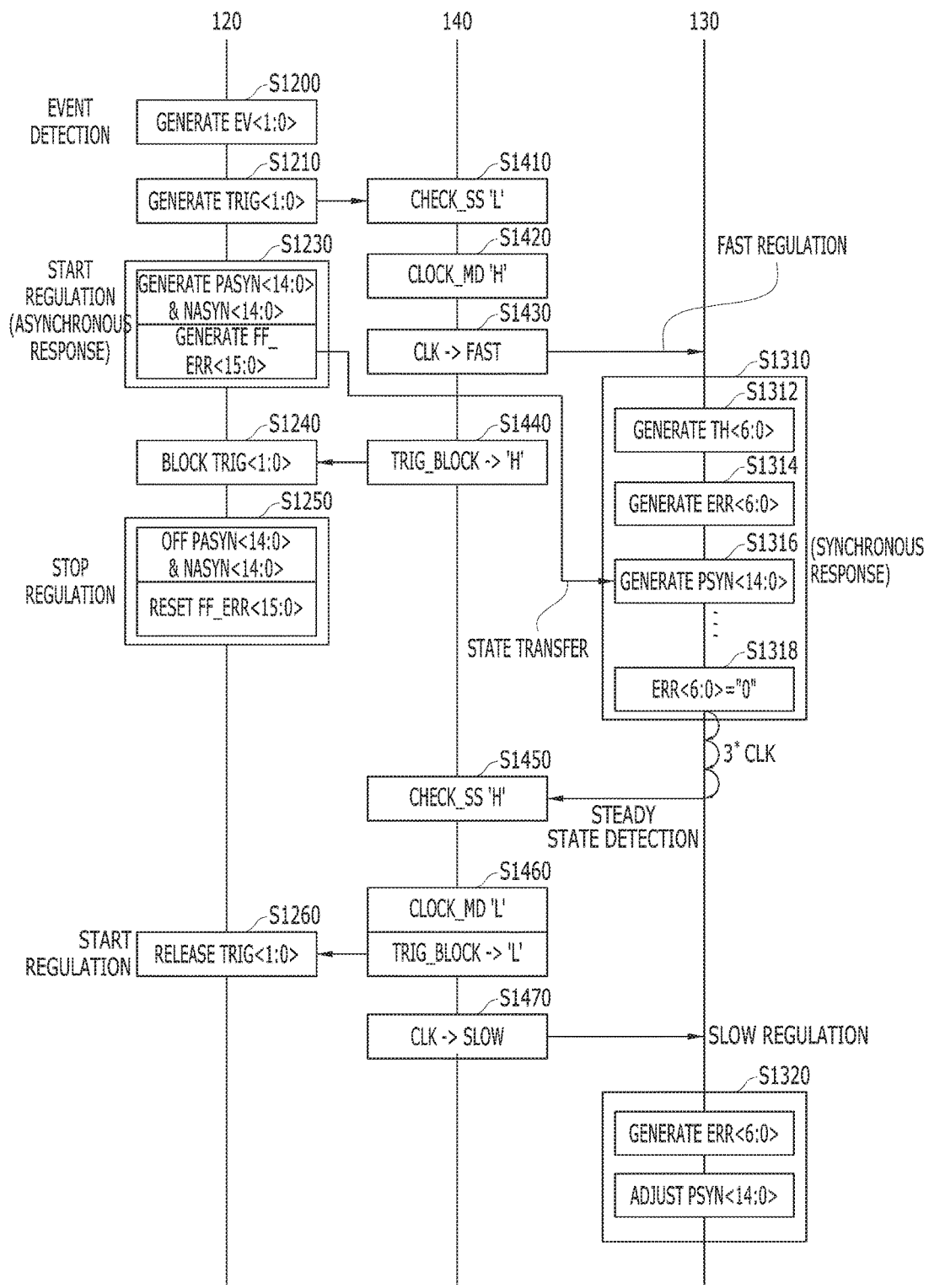
FIG. 14 is a flowchart describing an exemplary operation of the digital LDO regulator shown in FIG. 3.

FIG. 13 is a timing diagram illustrating an operation of the digital LDO regulator 100 shown in FIG. 3. FIG. 14 is a flowchart describing an operation of the digital LDO regulator 100 shown in FIG. 3.

FIGS. 13 and 14 show a case where undershoot occurs in the output voltage VOUT. The asynchronous analog-digital converter ADC 122 of the event-driven circuit 120 may detect that the output voltage VOUT is lower than the lower reference voltage ASYN_VREF<0>, and may activate and output a first bit EV<0> of the asynchronous error code EV<1:0> to a logic high level and output it in step S1210 (denoted as Event Detection in FIGS. 13 and 14).

The pulse generator 210 of the feed-forward controller 124 may activate and output the first bit TRIG<0> of the trigger signal TRIG<1:0> in response to the asynchronous error code EV<1:0> in step S1220.

The slope detector 230 may detect the slope of the output voltage VOUT according to the trigger signal TRIG<1:0> and output the slope detection signal SL<3:0>, and the FF controller 250 may generate the first drive control signal PNASYN<14:0> by reflecting the pull-up gain factor KFFP<3:0> and the pull-down gain factor KFFN<3:0> into the slope detection signal SL<3:0> in step S1230.

The slope detector 230 may output the slope detection signal SL<3:0> corresponding to the undershoot of the output voltage VOUT, and may adjust the first drive control signal PNASYN<14:0> so as to improve the pull-up driving force of the first array driver 160. The first array driver 160 may adjust the driving force of the output voltage VOUT in response to the first drive control signal PNASYN<14:0>. The FF controller 250 may sum up the pull-up control signal PASYN<14:0> and the pull-down control signal NASYN<14: 0> of the first drive control signal PNASYN<14:0> and output the first error information signal FF_ERR<15:0>.

The steady state detector 410 of the clock/trigger control circuit 140 may deactivate the steady state detection signal CHECK_SS into a logic low level in response to the activation of the first bit TRIG<0> of the trigger signal TRIG<1:0> in step S1410.

The clock/trigger controller 430 may invert and buffer the steady state detection signal CHECK_SS and output the clock mode signal CLK_MD in step S1420.

The clock generator 450 may generate a clock CLK of a fast cycle based on the clock mode signal CLK_MD of a logic high level in step S1430.

The time-driven circuit 130 may perform a fast regulation operation in synchronization with the clock CLK of a fast cycle in step S1310.

At the same time, the clock/trigger controller 430 may activate the trigger blocking signal TRIG_BLOCK in synchronization with a falling edge of the clock CLK based on the first error information signal FF_ERR<15:0> having a set or predetermined value in step S1440.

The event-driven circuit 120 may perform a blocking not to generate an additional trigger signal TRIG<1:0> in response to the in trigger blocking signal TRIG_BLOCK in step S1240 and initialize the first error information signal FF_ERR<15:0> and the first drive control signal PNASYN<14:0> in step S1250.

Therefore, in an embodiment of the present invention, when the time-driven circuit 130 operates according to the clock CLK of a fast cycle, the event-driven circuit 120 may prevent sudden overshoot or undershoot of the output voltage VOUT by controlling the first array driver 160 to be turned off and minimizing the operation sections of the time-driven circuit 130 and the event-driven circuit 120 from overlapping with each other.

The synchronous analog-digital converter ADC 132 of the time-driven circuit 130 may generate the multi-bit synchronization error code TH<0:6> by comparing the first to seventh synchronous reference voltages SYN_VREF<6:0> with the output voltage VOUT and detecting a change in the output voltage VOUT in step S1312.

The second error encoder 310 of the feedback controller 134 may generate the second error information signal ERR<6:0> by encoding the synchronization error code TH<0:6> in step S1314.

The proportional controller 320 may output the proportional control signal POUT<15:0> by shifting the second error information signal ERR<6:0> according to the proportional gain factor KP<3:0>. The integral controller 330 may generate the integral control signal IOUT<14:0> by shifting the second error information signal ERR<6:0> based on the integral gain factor KI<3:0> so as to produce the shift result S1<15:0> and summing up the shift result S1<15:0>, the previous integral control signal I_PART_PREV<14:0>, and the first error information signal FF_ERR<15:0>. As illustrated in FIG. 13, when the second error information signal ERR<6:0> and the shift result S1<15:0> are the same, the integral controller 330 may sum up the shift result S1<15:0> of '−15', the previous integral control signal I_PART_PREV<14:0> of '100', and the first error information signal FF_ERR<15:0> of '−50', and feed back the sum result (i.e., '+35') as the previous integral control signal I_PART_PREV<14:0> in synchronization with a falling edge of the clock CLK. The second summation element 340 may generate the second drive control signal PSYN<14:0> by summing up the proportional control signal POUT<15:0> and the integral control signal IOUT<14:0> in step S1316.

The time-driven circuit 130 may repeat the above operations of the steps S1312 to S1316 whenever the dock CLK is inputted.

Subsequently, when the no-error counting signal ZERO_ERR_CNT <1: 0> generated by counting cycles of the clock CLK reaches a set or predetermined number (for example, 3) while the second error information signal ERR<6:0> is maintained at the initial value (for example, '0'), the steady-state detector 410 may determine that the output voltage VOUT has become a steady state and activate the steady state detection signal CHECK_SS into a logic high level so as to inform that the output voltage VOUT is in the steady state in step S1450 (denoted as Steady State Detection in FIGS. 13 and 14).

Therefore, since the clock CLK is switched between a fast cycle and a slow cycle based on two conditions of a voltage condition as well as a stable state condition in an embodiment of the present invention, the stability may be improved, and the setting time may become shorter than when a single type of a condition, e.g., the voltage threshold value, is used.

The clock/trigger controller 430 may invert and buffer the steady state detection signal CHECK_SS to output the clock state signal CLK_MD of a logic low level and deactivate the trigger blocking signal TRIG_BLOCK in step S1460.

Accordingly, the clock generator 450 may generate a clock CLK of a slow cycle in step S1470.

As described above, when the state of the output voltage VOUT becomes a steady state, the event-driven circuit 120 may asynchronously detect whether the output voltage VOUT goes out of the threshold range or not and output the trigger signal TRIG<1:0> in step S1260, and the time-driven circuit 130 may perform a slow regulation operation in synchronization with the clock CLK of a slow period in step S1320.

In this case, according to an embodiment of the present invention, when the state of the output voltage VOUT becomes a steady state, the time-driven circuit 130 may drive the second array driver 170 at a low speed, thereby reducing standby power.

According to embodiments of the present invention, the digital LDO regulator is controlled according to the event-driven scheme in the initial stage of a regulation operation and controlled according to the time-driven scheme, thereafter, according to the clock CLK. As a result, the digital LDO regulator may improve the response time and the settling time simultaneously so as to improve the regulation performance.

While the present invention has been described with respect to the specific embodiments, it will be apparent to those skilled in the art in light of the foregoing description that various changes and modifications may be made without departing from the spirit and scope of the invention as defined in the following claims.

For example, a logic gate and a transistor described in embodiments of the present invention may be realized in different forms and arrangements according to the polarity of an inputted signal.

What is claimed is:

1. A digital Low Drop-Out (LDO) regulator, comprising: an event-driven circuit for generating a trigger signal by asynchronously detecting whether an output voltage is out of a threshold range or not, and generating a first error information signal and a first control signal based on the trigger signal; a time-driven circuit for generating a second error information signal by detecting a change in the output voltage in synchronization with a clock signal, and generating a second control signal by combining the first and second error information signals; a clock/trigger control circuit for generating the clock signal having a first cycle or a second cycle based on the trigger signal and the first and second error information signals; a first array driver for controlling a driving force of the is output voltage in response to the first control signal; and a second array driver for controlling the driving force of the output voltage in response to the second control signal.

2. The LDO regulator of claim 1, wherein the clock/trigger control circuit generates the clock signal such that it toggles at the first cycle when the trigger signal is activated, and when the number of clock cycles counted reaches a set number while the second error information signal is maintained at an initial value, the clock/trigger control circuit generates the clock signal such that it toggles at the second cycle which is longer than the first cycle.

3. The LDO regulator of claim 1, wherein the clock/trigger control circuit generates a trigger blocking signal which is activated when the output voltage is determined to be out of the threshold range based on the first error information signal, and which is deactivated when the output voltage is determined to be in a steady state based on the second error information signal, and
　　when the trigger blocking signal is activated, the event-driven circuit blocks the trigger signal from being generated.

4. The LDO regulator of claim 1, wherein the event-driven circuit includes: an asynchronous analog-digital converter (ADC) for generating an asynchronous error code by detecting whether the output voltage is out of the threshold range or not; and a feed-forward controller for generating the trigger signal in response to the asynchronous error code and the trigger blocking signal, and generating the first error information signal and the first control signal by detecting a slope of the output voltage based on the trigger signal.

5. The LDO regulator of claim 4, wherein the feed-forward controller includes: a pulse generator for generating the trigger signal that is activated in response to the asynchronous error code and deactivated in response to the trigger blocking signal; a slope detector for detecting a slope of the output voltage based on the trigger signal and outputting a slope detection signal; and a feed-forward (FF) controller for generating the first error information signal and the first control signal by reflecting a gain factor into the slope detection signal.

6. The LDO regulator of claim 5, wherein the slope detector includes:
　　a plurality of comparison elements that are activated in response to the trigger signal, and compare a plurality of detection reference signals with the output voltage and output the slope detection signal formed of a plurality of bits.

7. The LDO regulator of claim 6, wherein the slope detection signal includes a thermometer code that is formed of a unitary code.

8. The LDO regulator of claim 5, wherein the FF controller includes: a first error encoding element for generating a pull-up error information signal and a pull-down error information signal by encoding the slope detection signal; a first shifting element for generating the first control signal that includes a pull-up control signal and a pull-down control signal by shifting the pull-up error information signal and the pull-down error information signal based on a pull-up gain factor and a pull-down gain factor, respectively; and a first summation element for generating the first error information signal by summing up the pull-up control signal and the pull-down control signal.

9. The LDO regulator of claim 1, wherein the time-driven circuit includes: a synchronous analog-digital converter (ADC) for generating a synchronous error code by comparing a plurality of synchronous reference voltages with the output voltage in synchronization with the clock signal; and a feedback controller for generating the second error information signal based on the synchronous error code, and generating the second control signal by combining the first error information signal and the second error information signal.

10. The LDO regulator of claim 9, wherein the synchronous error code includes a thermometer code formed of a unitary code.

11. The LDO regulator of claim 9, wherein the feedback controller includes: a second error encoder for generating the second error information signal by encoding the synchronous error code; a proportional controller for generating a proportional control signal by shifting the second error information signal based on a proportional gain factor; an integral controller for shifting the second error information signal based on the integral gain factor so as to produce a shift result, and generating an integral control signal by summing up the shift result, a previous integral control signal, and the first error information signal; and a second summation component for generating the second control signal by summing up the proportional control signal and the integral control signal.

12. The LDO regulator of claim 1, wherein the clock/trigger control circuit includes: a steady state detector for generating a steady state detection signal that is deactivated based on the trigger signal and activated based on the second error information signal; a clock/trigger controller for generating a clock mode signal and a trigger blocking signal based on the steady state detection signal and the first error information signal; and a clock generator for generating the clock signal based on the clock mode signal.

13. The LDO regulator of claim 12, wherein the steady state detector includes: a counter for outputting a counting signal by counting pulses of the clock signal while the second error information signal is maintained at an initial value; and a signal generator for generating the steady state detection signal that is deactivated when the trigger signal is activated and activated when the counting signal becomes a set value.

14. The LDO regulator of claim 12, wherein the clock/trigger controller includes: a first signal output component for outputting the clock mode signal by inverting the steady state detection signal; and a second signal output component for outputting the trigger blocking signal that is activated when the first error information signal has a set value and deactivated in response to the activation of the steady state detection signal.

15. The LDO regulator of claim 1, wherein the first array driver includes:
　　a pull-up array that includes a plurality of pull-up transistors coupled in parallel between a power source voltage terminal and an output node, and that controls the number of the pull-up transistors turned on in response to a pull-up control signal of the first control signal; and
　　a pull-down array that includes a plurality of pull-down transistors coupled in parallel between the output node and the power source voltage terminal, and that controls the number of the pull-down transistors turned on in response to a pull-down control signal of the first control signal.

16. The LDO regulator of claim 1, wherein the second array driver includes:
　　a pull-up array that includes a plurality of pull-up transistors coupled in parallel between a power source voltage terminal and an output node, and that controls the number of the pull-up transistors which are turned on in response to the second control signal.

17. A method for operating a digital Low Drop-Out (LDO) regulator, the method comprising:
　　generating a trigger signal by asynchronously detecting whether an output voltage is out of a threshold range or not, and generating a first error information signal and a first control signal based on the trigger signal;
　　controlling a driving force of the output voltage in response to the first control signal;
　　generating a clock signal of a first cycle based on the trigger signal;

generating a second error information signal by detecting a change in the output voltage in synchronization with the clock signal of the first cycle, and generating a second control signal by combining the first error information signal and the second error information signal; and controlling the driving force of the output voltage in response to the second control signal.

18. The method of claim 17, further comprising:
generating a trigger blocking signal which is activated in synchronization with a falling edge of the clock signal when the first error information signal has a set value; and blocking the trigger signal from being generated based on the trigger blocking signal.

19. The method of claim 18, further comprising:
generating a steady state detection signal that is activated when the number of cycles of the clock signal counted reaches a set number while the second error information signal is maintained at an initial value; and deactivating the trigger blocking signal based on the steady state detection signal and generating a clock signal of a second cycle which is longer than the first cycle.

20. The method of claim 17, wherein the generating of the trigger signal, and the generating of the first error information signal and the first control signal based on the trigger signal includes:

detecting a slope of the output voltage based on the trigger signal and outputting a slope detection signal;

generating a pull-up error information signal and a pull-down error information signal by encoding the slope detection signal;

generating the first control signal that includes a pull-up control signal and a pull-down control signal by shifting the pull-up error information signal and the pull-down error information signal based on a pull-up gain factor and a pull-down gain factor, respectively; and generating the first error information signal by summing up the pull-up control signal and the pull-down control signal.

21. The method of claim 17, wherein the generating of the second error information signal, and the generating of the second control signal includes:

generating a proportional control signal by shifting the second error information signal based on a proportional gain factor;

shifting the second error information signal based on the integral gain factor so as to produce a shift result, and generating an integral control signal by summing up the shift result, a previous integral control signal, and the first error information signal; and generating the second control signal by summing up the proportional control signal and the integral control signal.

22. A digital Low Drop-Out (LDO) regulator comprising: a first circuit for generating a trigger signal, a first error information signal and a first control signal by asynchronously detecting an output voltage outside of a threshold range; a second circuit for detecting a change in the output voltage at each first cycle of a clock signal triggered by the trigger signal, and generating a second control signal according to the first error information signal and a result of the detecting; and a third circuit for adjusting the driving force of the output voltage in response to at least one of the first and second control signals.

* * * * *